US012121922B2

(12) United States Patent
Wilkey

(10) Patent No.: US 12,121,922 B2
(45) Date of Patent: Oct. 22, 2024

(54) SPRINKLER SLEEVE ASSEMBLY

(71) Applicant: Wateve, LLC, Phoenix, AZ (US)

(72) Inventor: Jackson Wilkey, Humble, TX (US)

(73) Assignee: Watere LLC, Phoenix, AZ (US)

( * ) Notice: Subject to any disclaimer, the term of this patent is extended or adjusted under 35 U.S.C. 154(b) by 164 days.

(21) Appl. No.: 17/680,180

(22) Filed: Feb. 24, 2022

(65) Prior Publication Data

US 2023/0264220 A1 Aug. 24, 2023

(51) Int. Cl.

*B05B 15/14* (2018.01)
*B05B 15/658* (2018.01)
*B05B 15/16* (2018.01)

(52) U.S. Cl.

CPC ............ *B05B 15/14* (2018.02); *B05B 15/658* (2018.02); *B05B 15/16* (2018.02); *Y10T 137/0402* (2015.04); *Y10T 137/6991* (2015.04); *Y10T 137/7021* (2015.04)

(58) Field of Classification Search

CPC . B05B 15/14; B05B 15/658; B05B 15/60–68; B05B 15/00–18; B05B 15/16; B05B 15/70; B05B 15/74; B05B 15/622; B05B 15/625; B05B 15/65; G01F 15/10; G01F 15/14; E03B 7/095–14; Y10T 137/6991–7065; Y10T 137/6995; Y10T 137/6984; Y10T 137/698; Y10T 137/6988; Y10T 137/6999; Y10T 137/367; Y10T 137/7043; Y10T 137/7047; Y10T 137/0441; Y10T 137/0486; Y10T 137/0491; Y10T 137/5497; Y10T 137/5462; Y10T 137/0402; Y10T 137/598; Y10T 137/7021; A01G 25/02

USPC .......... 137/363–372, 377–382.5, 15.08, 360, 137/361; 239/288.5, 288, 237, 288.3, 239/200–208, 103, 104, 279, 276, 600

See application file for complete search history.

(56) References Cited

U.S. PATENT DOCUMENTS

| | | | | | |
|---|---|---|---|---|---|
| 1,484,888 | A | * | 2/1924 | Johnson | B05B 15/74 239/456 |
| 1,871,258 | A | * | 8/1932 | Coles | B05B 15/74 239/206 |
| 2,527,950 | A | * | 10/1950 | Maness | B05B 1/3073 239/456 |
| 3,454,225 | A | * | 7/1969 | Hunter | B05B 1/14 239/514 |

(Continued)

OTHER PUBLICATIONS

OrbitSprinklerGuardDonut26062, retrieved from https://www.homedepot.com/p/Orbit-Sprinkler-Guard-Donut-26062/311348551 on Mar. 8, 2022.

(Continued)

*Primary Examiner* — Craig J Price

(74) *Attorney, Agent, or Firm* — Baumgartner Patent Law; Marc Baumgartner

(57) ABSTRACT

Disclosed herein are new sprinkler sleeve assemblies, and methods of use, configured to be placed around underground sprinkler heads to create a barrier between the sprinkler head and the surrounding soil. More specifically, the sprinkler sleeve assemblies comprise a top unit and a bottom unit, wherein the top unit comprises a vertical channel configured to surround the sprinkler head; and the bottom unit is configured to receive the top unit and can comprise one or more passageways that allow irrigation tubing to pass through.

20 Claims, 4 Drawing Sheets

(56) References Cited

U.S. PATENT DOCUMENTS

| | | | | | |
|---|---|---|---|---|---|
| 3,662,956 | A * | 5/1972 | Hedman | B05B 15/16 | 239/288.5 |
| 3,714,962 | A * | 2/1973 | Sauer et al. | A01G 25/00 | 239/207 |
| 3,929,288 | A * | 12/1975 | Brusadin | B05B 15/622 | 239/288.5 |
| 3,952,908 | A * | 4/1976 | Carson | H02B 1/06 | 220/831 |
| 3,964,688 | A * | 6/1976 | Sheets | B05B 3/0472 | 239/226 |
| 4,350,296 | A * | 9/1982 | Kuhlman | A01G 25/06 | D23/218 |
| 4,781,327 | A * | 11/1988 | Lawson | B05B 3/0477 | 239/206 |
| 4,928,426 | A * | 5/1990 | Janssens | A01G 27/006 | 47/78 |
| 5,039,011 | A * | 8/1991 | Parker | F16L 35/00 | 239/588 |
| 5,213,262 | A * | 5/1993 | Violette | H04N 5/272 | 47/33 |
| 5,772,118 | A * | 6/1998 | Fabiano | B05B 15/16 | 239/288.5 |
| 5,938,121 | A * | 8/1999 | Ferguson | B05B 15/74 | 239/203 |
| 6,494,386 | B1 * | 12/2002 | Banu | B05B 15/74 | 239/206 |
| 6,543,704 | B2 * | 4/2003 | Stephens | B05B 15/16 | 239/288.5 |
| 6,712,086 | B1 * | 3/2004 | Fails | E03B 7/072 | 137/364 |
| 6,932,099 | B2 * | 8/2005 | Mahaney | H02G 9/10 | 137/364 |
| 7,004,677 | B1 * | 2/2006 | Ericksen | A01G 25/162 | 137/364 |
| 7,114,665 | B1 * | 10/2006 | Mc Tee | B05B 15/74 | 239/288.5 |
| 7,243,810 | B2 * | 7/2007 | O'Brien | E03B 7/095 | 220/4.24 |
| 7,717,360 | B1 * | 5/2010 | Kander | B05B 15/16 | 239/285 |
| 8,517,286 | B2 * | 8/2013 | Jung | B05B 15/16 | 239/288.5 |
| 8,550,375 | B2 * | 10/2013 | Curtis | A01G 25/00 | 248/156 |
| 9,149,825 | B1 * | 10/2015 | Blakeslee | B05B 15/16 | |
| 9,518,369 | B2 * | 12/2016 | Ducote | E02D 29/1409 | |
| 10,124,360 | B2 * | 11/2018 | Clay | B05B 15/16 | |
| 10,220,403 | B2 * | 3/2019 | Orth | B05B 15/16 | |
| 10,335,821 | B2 * | 7/2019 | Schneider | B05B 15/16 | |
| 11,059,067 | B1 * | 7/2021 | Afshin | B05B 15/622 | |
| 11,209,094 | B2 * | 12/2021 | Hansen | F16K 35/06 | |
| 11,484,904 | B1 * | 11/2022 | Sports | A01G 25/00 | |
| 11,596,966 | B1 * | 3/2023 | Wellner | B05B 15/16 | |
| 11,628,461 | B2 * | 4/2023 | Barbian | B05B 15/16 | 239/288.5 |
| 11,628,966 | B2 * | 4/2023 | Avalos | B65D 1/0207 | 206/524.6 |
| 2005/0284956 | A1 * | 12/2005 | Mast | B05B 15/74 | 239/203 |
| 2007/0095936 | A1 * | 5/2007 | Ungerecht | B05B 15/16 | 239/203 |
| 2008/0302883 | A1 * | 12/2008 | Gunderson | B05B 15/16 | 239/104 |
| 2009/0084869 | A1 * | 4/2009 | Lin | B05B 15/16 | 239/201 |
| 2009/0277974 | A1 * | 11/2009 | Citrawireja | B05B 15/16 | 239/203 |
| 2017/0320086 | A1 * | 11/2017 | Orth | B05B 15/16 | |
| 2020/0056860 | A1 * | 2/2020 | Glaser | B44F 9/00 | |
| 2021/0129169 | A1 * | 5/2021 | Hyatt | B05B 15/16 | |
| 2023/0082192 | A1 * | 3/2023 | Bjerke | A01G 25/06 | 137/371 |

OTHER PUBLICATIONS

Sprinkler Buddy 15 Pack—See Video Sprinkler Donuts, Sprinkler Guard Protectors, retrieved from https://www.ebay.com/itm/265270574181?chn=ps&_trkparms=ispr%3D1&amdata=enc%3A1i_JiTe96QMuPzuKsiilKTA2&norover=1&mkevt=1&mkrid=711-117182-37290-0&mkcid=2&itemid=265270574181&targetid=1262843335089&device=c&mktype=pla&googleloc=9033152&poi=&campaignid=12874650447&mkgroupid=121788266346&rlsatarget=pla-1262843335089&abcld=9300535&merchantid=6296724&gclid=CjwKCAjwtfqKBhBoEiwAZuesiN5itHjHdeOl43nXauKRYIPP84nBgUMe7RSLNuelciMzsiVNjr_ZBBoCkawQAvD_BwE on Mar. 8, 2022.

Sprinkler Saver, retrieved from http://www.sprinklersaver.com/ on Mar. 8, 2022.

Grasshlole, retrieved from https://grassholesystem.com/products/ on Mar. 8, 2022.

6 Inch Lawn Underground Valve Box Cap Plastic Sprinkler Watering Valve Cover retrieved from https://www.ebay.com/itm/193703008560?chn=ps&_trkparms=ispr%3D1&amdata=enc%3A1vi7Oa5psTnS2ZwBg2OwlqQ45&norover=1&mkevt=1&mkrid=711-117182-37290-0&mkcid=2&iremid=193703008560&targetid=1262375642056&device=c&mktype=pla&googleloc-9033152&poi=&campaignid=12875707346&mkgroupid=127864788648&rlsatarget=pla-1262375642056&abcId=9300535&merchantid=264941002&gclid=CjwKCAjwtfqKBhBoErwAZuesiOQwa5OSyFizEXIH8KcveainfXdXKTR5hpt5WCbODMh20Xlnv9bkDR0CcFsQAvD_BwE on Mar. 8, 2022.

* cited by examiner

SPRINKLER SLEEVE ASSEMBLY

FIELD OF THE INVENTION

The invention pertains to the field of underground irrigation systems and is directed to products and methods that make it easier for a user to remove and/or install sprinkler heads. More particularly, the invention relates to sleeve assemblies positioned around an underground sprinkler head that allows for a user to remove and install new sprinkler heads more efficiently.

BACKGROUND

Underground irrigation systems are utilized both residentially and commercially to water grass, flowers, fruits, vegetables, and other plants. Simple irrigation systems can be used with yards and gardens for single family homes and more intricate systems can be used to water large areas such as apartment complexes. In general, these systems use underground conduits or tubing that is coupled to pop-up sprinkler heads that can rise upward when water pressure increases and lower when the water pressure decreases.

The bottom of sprinkler heads is typically configured to couple into vertically upright threaded couplers (that can include tees or risers, for example) positioned underground that are in turn connected to the underground tubing. More specifically, the sprinkler's bottom and the coupler have complementary threads that allow the sprinkler head to be rotationally coupled to and removed from the coupler. Typically, the bottom of the sprinkler head has a female threaded inlet that the complementary male end of the coupler screws into.

Prior art sprinkler heads are buried entirely, or almost entirely, underground with the nozzle being exposed above ground. Unfortunately, the surrounding dirt around theses sprinkler head compacts around the body of the sprinkler head and creates a tight fit. When a sprinkler head is suspected of being damaged, the surrounding compacted dirt makes it difficult for a user to remove the head from the coupler for inspection. The user must dig around the targeted sprinkler head and hope they don't puncture the tubing or damage the sprinkler head. This can be a messy and time-consuming endeavor, especially if the soil is highly compacted, is rocky, or otherwise has a dense composition, such as clay-like dirt.

Accordingly, there is a need in the art to provide new products and methods of installing sprinkler heads to underground irrigation systems that allow a user to easily remove the sprinkler head from the coupler to inspect, replace, and or repair it.

SUMMARY

Various aspects of the invention are enumerated in the following paragraphs.

Preferred embodiments are directed to a sprinkler sleeve assembly comprising a top unit and a bottom unit, wherein the top unit comprises an upper perimeter coupled to siding having an inner and outer face and that terminates to a lower perimeter, wherein the upper and lower perimeters define an internal space, and wherein the top unit further comprises a vertical traversing channel having upper and lower openings and positioned within the internal space and configured to surround a sprinkler head; and the bottom unit comprises an upper perimeter coupled with siding having an inner and outer face and that terminates to a lower perimeter, wherein the upper and lower perimeters define an internal space configured to receive the top unit, such that the top unit can be received within the bottom unit.

Preferred embodiments include assemblies configured so the top unit can slide into bottom unit such that the upper perimeter of the top unit rests on top of the upper perimeter of the bottom unit.

Preferred embodiments include assemblies wherein the upper perimeter of the top unit is larger than the lower perimeter of the top unit and the siding of the top unit tapers from the upper perimeter down to the lower perimeter. The sprinkler sleeve assembly of claim 1, wherein the channel is concentric with the upper perimeter of the top unit.

Preferred embodiments include assemblies wherein the top unit further comprises one or more supports that couple the channel to the inner face of the siding.

Preferred embodiments include assemblies wherein the one or more supports is a solid inner floor that surrounds the channel.

Preferred embodiments include assemblies wherein the solid inner floor is positioned at the lower perimeter of the top unit.

Preferred embodiments include assemblies wherein the solid inner floor is positioned between the lower perimeter and the upper perimeter of the top unit.

Preferred embodiments include assemblies wherein the bottom unit further comprises one or more passageways that allow irrigation tubing to pass through.

Preferred embodiments include assemblies wherein the siding of the top unit comprises a first set of two opposing sides, and said one or more passageways comprise two horizontally aligned openings on said opposing sides to allow for passage of tubing in a first direction.

Preferred embodiments include assemblies wherein the siding of the top unit comprises a second sets of two opposing sides, and said one or more passageways comprise at least one opening for passage of tubing perpendicular to the tubing in the first direction.

Preferred embodiments include assemblies wherein the one or more passageways are cutaways positioned on the lower perimeter.

Preferred embodiments include assemblies wherein the upper perimeter of the bottom unit is smaller than the lower perimeter of the bottom unit, such that the siding of the bottom unit flares from the upper perimeter down to the lower perimeter.

Preferred embodiments include assemblies wherein the lower perimeter of the top unit does not block the one or more passageways when positioned into the bottom unit.

Preferred embodiments include methods of installing an irrigation system comprising: providing the sleeve assembly of claim 9; providing a sprinkler head; providing irrigation tubing operably coupled to a sprinkler coupler; and positioning the bottom unit of the sleeve assembly over the sprinkler coupler such that the irrigation tubing traverses though the one or more passageway sections; releasably attaching the sprinkler head with the sprinkler coupler; and positioning the top unit into the bottom unit, such that the attached sprinkler head traverses through the vertical channel.

Preferred embodiments include methods wherein the upper perimeter of the top unit is larger than the lower perimeter of the top unit and the siding of the top unit tapers from the upper perimeter down to the lower perimeter.

Preferred embodiments include methods wherein the upper perimeter of the bottom unit is smaller than the lower perimeter of the bottom unit, such that the siding of the bottom unit flares from the upper perimeter down to the lower perimeter.

Preferred embodiments include methods wherein the top unit further comprises one or more supports that couple the channel to the inner face of the siding.

Preferred embodiments include methods wherein the siding of the top unit comprises a second sets of two opposing sides and said one or more passageways comprise at least one opening for passage of tubing perpendicular to the tubing in the first direction.

Preferred embodiments include methods wherein the one or more passageways are cutaways positioned on the lower perimeter.

DETAILED DESCRIPTION OF THE INVENTION

The teachings herein are directed to new sprinkler sleeve assemblies and methods of use. In general, the assemblies 44 herein comprise at least two units: a top unit 2 and a bottom unit 18 configured to receive said top unit 2.

Figure 1:
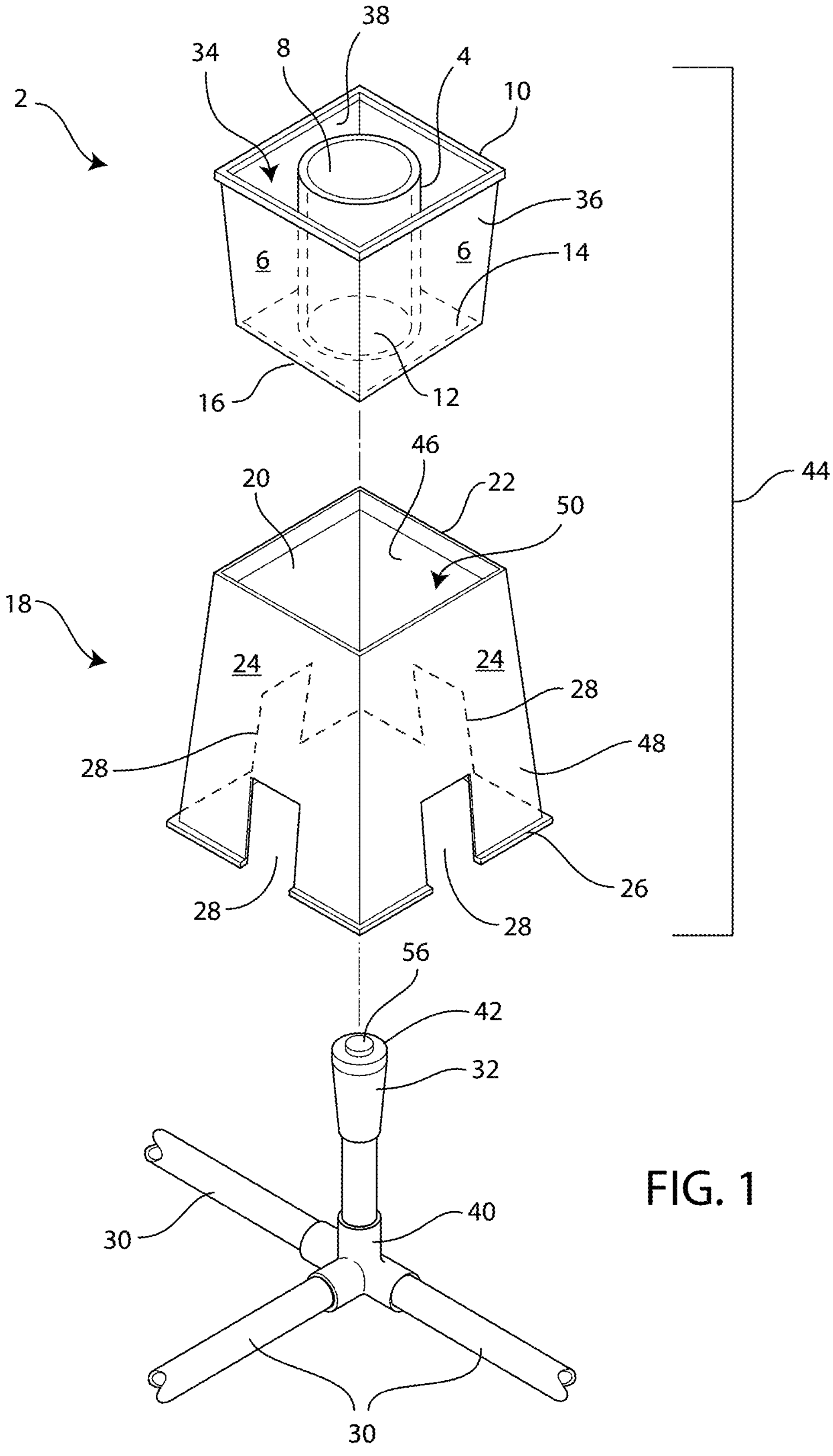
FIG. 1 is a perspective view of an exploded sprinkler sleeve assembly and underground irrigation system.

FIG. 1 depicts a view of a preferred top unit 2. While shown as having a trapezoidal cross-section, other suitable shapes, non-exclusively including cylindrical, rectangular, oval, square, can also be used. According to preferred embodiments, the top unit 2 comprises an upper perimeter 10 coupled to siding 6 having an inner face 38 and an outer face 36 and that terminates to a lower perimeter 16, wherein the upper and lower perimeters define an internal space 34, and wherein the top unit 2 further comprises a vertical traversing channel 4 having an upper opening 8 and a lower opening 12 and positioned within the internal space 34 and configured to surround a sprinkler head 32. According to preferred embodiments there is a gap 52 between the sprinkler head 32 and the channel 4 such that the siding of the sprinkler head 32 is not in contact with the channel 4. More specifically there is a gap so that the top unit 2 can be removed from the bottom unit 18 while the sprinkler head 32 is still coupled underground. As an example, if the sprinkler head 32 diameter is 7.30 cm, it would be preferred that the diameter of the channel 4 be about 7.62 cm. The gap 52 is preferably not larger than 1.27 cm to prevent excess soil from entering the channel 4 but can be non-exclusively be between the range of 0.079 cm to 3.81 cm. A channel 4 diameter of greater than 7.30 cm such as between 7.46 cm to 10.16 cm is preferred to accept common sprinkler head sizes, such as 7.30 cm and 6.03 cm sprinkler heads. According to other embodiments, the sprinkler head 32 body can abut the inner channel 4 sides, without a discernable gap.

According to preferred embodiments, when a user wants to decouple a particular sprinkler head 32 from an underground coupler 40, they can manually remove the top unit 2 (such as by lifting up on the upper perimeter 10) from the bottom unit 18. The user can then readily access the sprinkler head 32 that is not surrounded by compacted soil due to the barrier of the channel 4. The sprinkler head 32 can thus be easily decoupled (e.g., unscrewed) from the coupler 40 positioned below the ground surface 54 without dealing with the problem of compacted or otherwise dense soil inhibiting said decoupling. After the targeted sprinkler head 32 is decoupled from the coupler 40 a user can insert the repaired or new sprinkler head into the coupler 40, preferably while the top unit 2 is removed from the bottom unit 18. After the sprinkler head 32 is attached to the coupler 40, the top unit 2 can be placed back into the bottom unit 18.

While the channel 4 does not have to traverse the entire vertical length of the top unit 2, it is preferred that it does, thereby having the upper opening 8 vertically aligned with the upper perimeter 10 and the lower opening 12 vertically aligned with the lower perimeter 16.

According to preferred embodiments, the channel 4 is positioned along a vertical axis of the top unit 2 and has the same diameter throughout, although variable diameters can also be used. Preferred shapes of the channel 4 are cylindrical as most sprinkler heads are this shape, but other cross-sectional shapes such as rectangular, square, and oval can also be used. Regardless of shape, it is non-exclusively preferred to have a small gap 52 between the sprinkler head 32 and the channel 4 that is maintained. According to preferred embodiments, the channel 4 is concentric with the upper perimeter 10 of the top unit 2.

Figure 4:
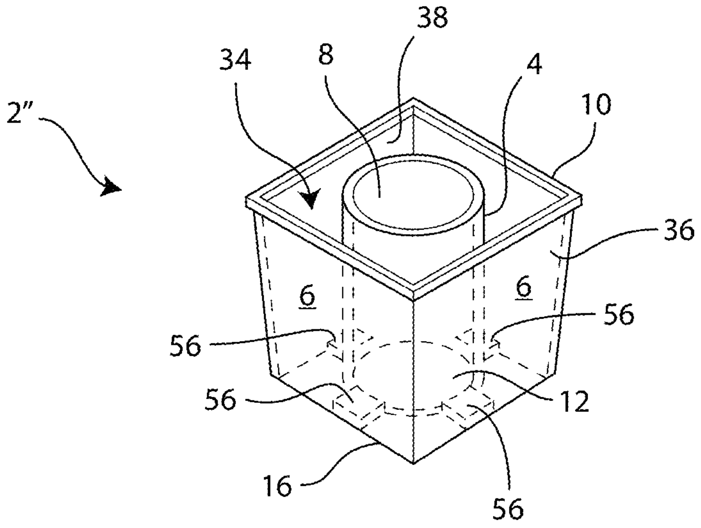
FIG. 4 is a perspective view an alternative top unit with struts.

According to preferred embodiments, the top unit 2 further comprises one or more supports that couple the channel 4 to the inner face 38 of the top unit siding 6. According to non-preferred embodiments, these supports can be horizontal struts 56, such as shown in alternative top unit 2" in FIG. 4, or spokes, or a perforated floor connecting the channel 4 and the inner face 38 of the top unit siding 6. These embodiments are not preferred as unwanted soil can enter the bottom unit 18 and/or compact around the sprinkler head 32. Accordingly, preferred embodiments are directed to the support being a solid inner floor 14 that surrounds the channel 4 and prevents soil from entering the bottom unit 18 and/or compacting around the sprinkler head 32.

Figure 3:
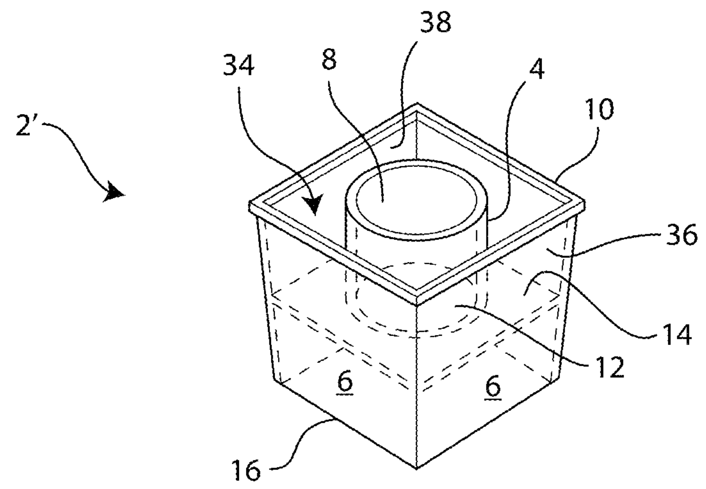
FIG. 3 is a perspective view an alternative top unit with a floor positioned between the upper and lower perimeters of the top unit.

The one or more supports can be positioned in any suitable vertical position within the internal space 34 of the top unit 2 but are preferably positioned at the lower perimeter 16 of the top unit 2, or within 1.27 cm thereof. More specifically, the floor 14 is preferably positioned at the same vertical level of the lower opening 12 of the channel 4. Vertically aligning the supports with the lower perimeter 16, or at least lower than the upper perimeter 10, as shown in alternative top unit 2' in FIG. 3, advantageously allows for the user to place soil and/or grass/rocks into this internal space 34 to blend the assembly 44 into its environment or otherwise create a more decorative aesthetic compared to having an exposed support/floor 14 positioned at or near the upper perimeter 10.

FIG. 1 depicts a view of a preferred bottom unit 18. While shown as having a trapezoidal cross-section, other suitable shapes, non-exclusively including cylindrical, rectangular, oval, square, can also be used. Preferably, the cross-sectional shape of the bottom unit is the same general shape as the cross section of the top unit, e.g., they are both trapezoidal or both are cylindrical. According to preferred embodiments, the bottom unit 18 comprises an upper perimeter 22 coupled to siding 24 having an inner face 46 and an outer face 48 and that terminates to a lower perimeter 26, wherein the upper and lower perimeters define an internal space 50. The internal space 50 of the bottom unit 18 is accessible through an upper opening 20 configured to receive the top unit 2. Accordingly, the perimeter of the upper opening 20 is larger than the lower perimeter 16 of the top unit 2. Preferred assemblies 44 include embodiments wherein the top unit 2 slides into the upper opening 20 of the bottom unit 18 such that the upper perimeter 10 of the top unit rests on top of the upper perimeter 22 of the bottom unit, as shown in assembled view of the assembly 44 in FIG. 2 and positioned entirely or mainly under the ground surface 54. According to this embodiment, the upper perimeter 10 acts as a lip and has a larger perimeter than the upper perimeter 22 of the bottom unit. Alternatively, the top unit can rest on shelving or supports within the internal space 50 of the bottom unit 18. Still further: coupling devices, such as: tabs, snaps, and hook and loop fasteners can facilitate the top unit 2 being received by the bottom unit 18.

Preferred embodiments involve the upper perimeter 10 of the top unit being larger than the lower perimeter 16 of the top unit such that the siding 6 of the top unit tapers from the upper perimeter 10 down to the lower perimeter 16. Similarly, it is preferred that the bottom unit 18 has an upper perimeter 22 that is smaller than the lower perimeter 26 of the bottom unit, such that the siding 24 of the bottom unit flares out from the upper perimeter 22 down to the lower perimeter 26. The above-described tapering and flaring of the top unit 2 and bottom unit 18 respectfully is also advantageous in that it allows for top units 2 to be stacked together and bottom units 18 to be stacked together for easier packaging, storage, and shipping. Top and bottom units having non-trapezoidal cross-sections, such as cylindrical, rectangular, oval, square, can also be tapered and flared as described above.

Figure 2:
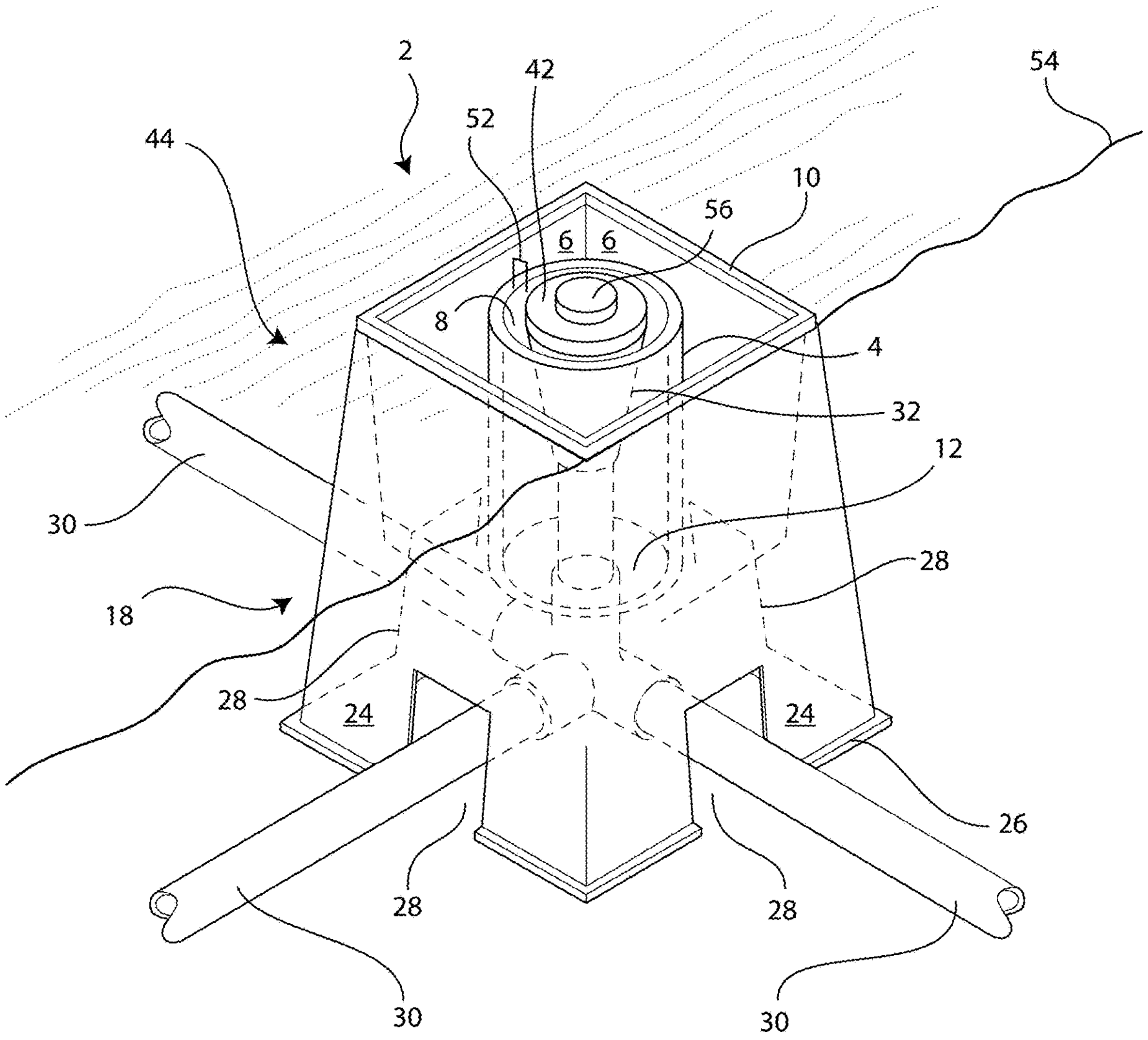
FIG. 2 is a perspective view an assembled sprinkler sleeve assembly positioned with an underground irrigation system.

According to preferred embodiments, the sprinkler sleeve assemblies 44 herein include a bottom unit 18 having one or more passageways 28 that allow irrigation tubing 30 to pass through, as shown in FIG. 2. While shown as cutaways on the lower perimeter 26 of the bottom unit 18, these one or more passageways 28 can be any suitably shaped hole through a position of the siding 24 of the bottom unit, non-exclusively including circular, square, rectangular, or oval shaped holes. According to certain embodiments, the passageways can be solid when purchased, but outlined and/or perforated so a user can simply cut the passageways out of the bottom unit to create the openings for the tubing. These outlines and/or perforations can be different sizes and numbers to allow for different sized tubing 30 (e.g., ¾ or ½" tubing) and number of tubes. Cutaways on the lower perimeter 26 of the bottom unit 18 allows the installer to easily place the bottom unit 18 on top of existing tubing 30 as shown in FIG. 2. In contrast, if the one or more passageways are holes within the siding 6, then existing tubing 30 would have to be decoupled to pass through the bottom unit 18. The one or more passageways 28 are also helpful in aligning the bottom unit 18 directly over a coupler 40 so that a sprinkler head 32 can be easily attached to said coupler 40 while the bottom unit remains in place. In contrast, and according to non-preferred embodiments, the bottom unit 18 could simply be positioned above the tubing 30. According to this embodiment, the bottom unit could lack one or more passageways.

According to preferred embodiments, the one or more passageways 28 are positioned below the lower perimeter 16 of the top unit 2 when the top unit 2 is received within the bottom unit 18, such as when the upper perimeter 10 of the top unit 2 is resting on the upper perimeter 22 of the bottom unit 18. This configuration, shown in FIG. 2, ensures that the top unit 2 is not blocking the tubing 30 from passing through the bottom unit 2, which is undesirable.

The number of passageways can non-exclusively be zero, one, two, three, or four on the bottom unit 18. More specifically, these one or more passageways 28 are preferably two horizontally aligned openings on a first set of opposing sides of the siding 24 to allow for passage of tubing 30 in a first direction. For embodiments wherein the bottom unit lacks opposing sides, such as an oval or circular cross-sectional shape, it is preferred that there is at least a first set of opposing passageways horizontally aligned. Further embodiments encompass a bottom unit having a second set of opposing sides of the siding 24, with one or more horizontally aligned openings (e.g., one or two) configured for the passage of tubing 30 in a second direction, perpendicular to the tubing 30 in the first direction, as shown in FIG. 2. Further embodiments encompass a bottom unit having a single passageway where a single tube 30 enters and terminates within the internal space 50 of the bottom unit 18. Regardless of whether one or more tubes pass through the one or more passageways 28 in the bottom unit 18 siding 24, it is preferred that a coupler 40 is operably coupled to said tubing 30 to allow for water to travel into the attached sprinkler head 32 through the head's inlet at its bottom side.

Both the top and bottom units (2 and 18) can be made of any suitable material including plastic (e.g., polypropylene), rubber, and/or metal or a combination thereof. According to preferred embodiments, both the top and bottom units (2 and 18) are individually made of the same material throughout, and more preferably plastic.

Figure 5:
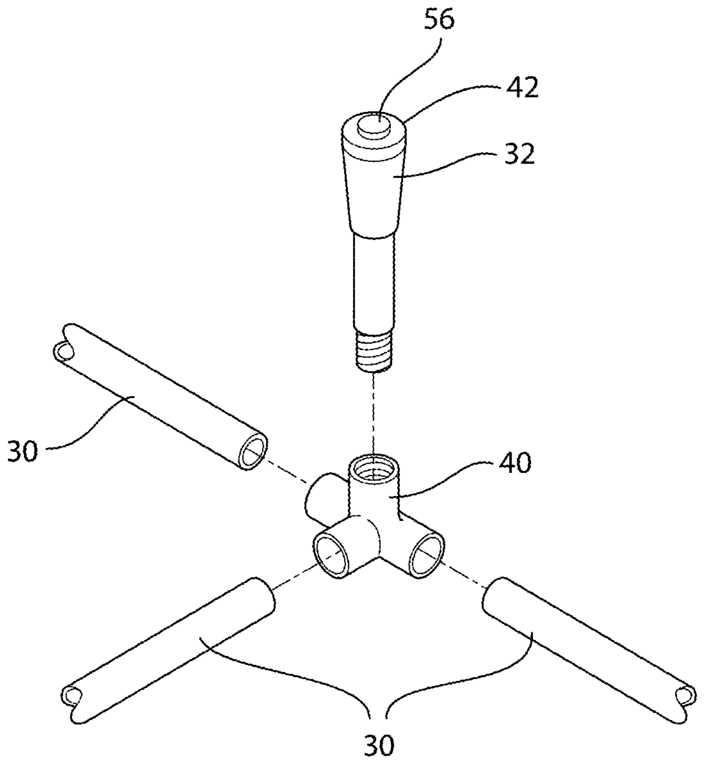
FIG. 5 is an exploded perspective view of irrigation tubing, a sprinkler, and sprinkler coupler.

Preferred methods herein include installing a new or modifying an existing irrigation system utilizing the sprinkler sleeve assemblies 44 described herein. A user can install or work with any existing irrigation tubing coupled to one or more couplers 40 individually configured to releasably attach one or more sprinkler heads 32. FIG. 5 shows an exploded view of a sprinkler head 32, tubing 30, and a sprinkler head coupler 40 before assembly. According to preferred embodiments, the user positions a bottom unit 18 over a coupler 40. Preferably this is done wherein one or more tubes 30 traverse though one or more passageway sections in the siding 24 of the bottom unit 18 and is operably coupled to the coupler 40 within the internal space of the bottom unit 50. More specifically, it is preferred that the bottom unit 18 includes cutaways 28 along the lower perimeter 26 to allow the user to place the cutaways 28 over one or more sections of irrigation tubing 40. According to non-preferred embodiments, the tubing can be passed through one or more holes within the siding of the bottom unit; this can be done by decoupling existing tubing or inserting new tubing through the one or more holes and attaching/reattaching it to a coupler within the internal space of the bottom unit. According to non-preferred embodiments, the bottom unit is simply position over a coupler and above the irrigation tubing. These embodiments could be utilized with bottom units lacking any passageways, such as cutaways or holes Before or after the bottom unit 18 is positioned on top of a coupler 40, a sprinkler head 32 can be coupled to the coupler 40. Coupling the sprinkler head 32 expressly includes coupling directly into the coupler 40 or into an adapter and or a riser coupled to the coupler 40. After the sprinkler head 32 is coupled to the coupler 40, and the bottom unit 18 is positioned over the coupler 40, the top unit 2 can be positioned into the bottom unit 18, such that the attached sprinkler head 32 traverses through the vertical channel 4 within the top unit 2. In this configuration, the top (e.g., cap 42 and/or the nozzle 56) of the sprinkler head 32 is positioned at or near the upper opening 8 of the channel 4 when the nozzle 56 is in its retracted, non-operational position, such as within 1.27 cm above or below the upper opening 8, as a non-exclusive embodiment.

The foregoing descriptions of specific implementations have been presented for purposes of illustration and description. They are not intended to be exhaustive or to limit the invention to the precise forms disclosed, and modifications and variations are possible in view of the above teaching. The exemplary implementations were chosen and described to best explain the principles of the invention and its practical application, to thereby enable others skilled in the art to best utilize the invention and its implementations with modifications as suited to the use contemplated.

It is therefore submitted that the invention has been shown and described in the most practical and exemplary implementations. It should be recognized that departures can be made which fall within the scope of the invention. With respect to the description provided herein, it is submitted that the optimal features of the invention include variations in size, materials, shape, form, function, manner of operation, assembly, and use. All structures, functions, and relationships equivalent or essentially equivalent to those disclosed are intended to be encompassed by the invention.

The invention claimed is:

1. A sprinkler sleeve assembly comprising:

a top unit, a bottom unit, and a sprinkler head having upper and lower ends; wherein the top unit comprises an upper perimeter coupled to siding having an inner and outer face and that terminates to a lower perimeter, wherein the upper and lower perimeters define an internal space, and wherein the top unit further comprises a vertical traversing channel having upper and lower openings and positioned within the internal space and configured to surround the sprinkler head; wherein the top unit further comprises one or more supports that couple the vertical traversing channel to the inner face of the siding and wherein the internal space is filled with a substance selected from the group consisting of: soil, grass, and rocks; and the bottom unit comprises an upper perimeter coupled with siding having an inner and outer face and that terminates to a lower perimeter, wherein the upper and lower perimeters define an internal space configured to receive the top unit, such that the top unit can be received within the bottom unit; wherein the lower perimeter of the bottom unit lacks flooring positioned at the lower perimeter within the internal space; and wherein the lower opening of the vertical traversing channel is configured to allow the lower end of the sprinkler head to traverse through, below the lower perimeter of the top unit, and wherein the sprinkler head is not attached to the top unit.

2. The sprinkler sleeve assembly of claim 1, wherein the assembly is configured so the top unit can slide into the bottom unit such that the upper perimeter of the top unit rests on top of the upper perimeter of the bottom unit.

3. The sprinkler sleeve assembly of claim 1, wherein the upper perimeter of the top unit is larger than the lower perimeter of the top unit and the siding of the top unit linearly tapers from the upper perimeter down to the lower perimeter.

4. The sprinkler sleeve assembly of claim 1, wherein the vertical traversing channel is concentric with the upper perimeter of the top unit.

5. The sprinkler sleeve assembly of claim 1, wherein the one or more supports is a solid inner floor that surrounds the vertical traversing channel; such that there are no openings in the solid inner floor for its entirety between the inner face of the top unit siding and the vertical traversing channel.

6. The sprinkler sleeve assembly of claim 5, wherein the solid inner floor is positioned at and not higher than the lower perimeter of the top unit.

7. The sprinkler sleeve assembly of claim 6, wherein the solid inner floor is positioned between the lower perimeter and the upper perimeter of the top unit.

8. The sprinkler sleeve assembly of claim 1, wherein the bottom unit further comprises one or more passageways aligned in a horizontal and perpendicular direction to the vertical traversing channel of the top unit to allow irrigation tubing to pass through.

9. The sprinkler sleeve assembly of claim 8, wherein the siding of the bottom unit comprises a first set of two opposing sides, and said one or more passageways comprise two horizontally aligned openings on said opposing sides to allow for passage of the irrigation tubing in a first direction that is horizontal and perpendicular to the vertical traversing channel of the top unit.

10. The sprinkler sleeve assembly of claim 9, wherein the siding of the bottom unit comprises a second set of two opposing sides, and said one or more passageways comprise at least one opening for passage of tubing horizontal and perpendicular to the irrigation tubing in the first direction.

11. The sprinkler sleeve assembly of claim 8, wherein the one or more passageways are cutaways having a lower end and positioned on the lower perimeter of the bottom unit and are open and lack a connective material at their lower end; such that they can be positioned on top of the irrigation tubing.

12. A method of installing an irrigation system comprising:

providing the sprinkler sleeve assembly of claim 8;

providing the irrigation tubing operably coupled to a sprinkler coupler; and positioning the bottom unit of the sleeve assembly over the sprinkler coupler such that the irrigation tubing traverses though the one or more passageways;

releasably attaching the lower end of the sprinkler head with the sprinkler coupler; and positioning the top unit into the bottom unit, such that the sprinkler head, that is releasably attached to the sprinkler coupler, traverses through the vertical traversing channel and such that the top unit can be removed out of the bottom unit while the lower end of the sprinkler head is releasably attached to the sprinkler coupler.

13. The method of claim 12, wherein the upper perimeter of the top unit is larger than the lower perimeter of the top unit and the siding of the top unit linearly tapers from the upper perimeter down to the lower perimeter; and the upper perimeter of the bottom unit is smaller than the lower perimeter of the bottom unit, such that the siding of the bottom unit flares from the upper perimeter down to the lower perimeter.

14. The method of claim 12, wherein the siding of the bottom unit comprises a first set of two opposing sides and said one or more passageways comprise two horizontally aligned openings on said opposing sides to allow for passage of the irrigation tubing in a first direction that is horizontal and perpendicular to the vertical traversing channel of the top unit.

15. The method of claim 12, wherein the one or more passageways are cutaways having a lower end and positioned on the lower perimeter of the bottom unit and are open and lack a connective material at their lower end; such that they can be positioned on top of the irrigation tubing.

16. The method of claim 12, wherein the substance in the internal space is soil and grass.

17. The method of claim 12, wherein the vertical channel only traverses upward from the one or more supports such that it does not traverse below the one or more supports.

18. The sprinkler sleeve assembly of claim 1, wherein the upper perimeter of the bottom unit is smaller than the lower perimeter of the bottom unit, such that the siding of the bottom unit flares from the upper perimeter down to the lower perimeter; and wherein the upper perimeter of the top unit is larger than the lower perimeter of the top unit and the siding of the top unit linearly tapers from the upper perimeter down to the lower perimeter.

19. The sprinkler sleeve assembly of claim 1, wherein the substance in the internal space is soil and grass.

20. The sprinkler sleeve assembly of claim 1, wherein the vertical channel only traverses upward from the one or more supports such that it does not traverse below the one or more supports.

* * * * *